Figure 1:
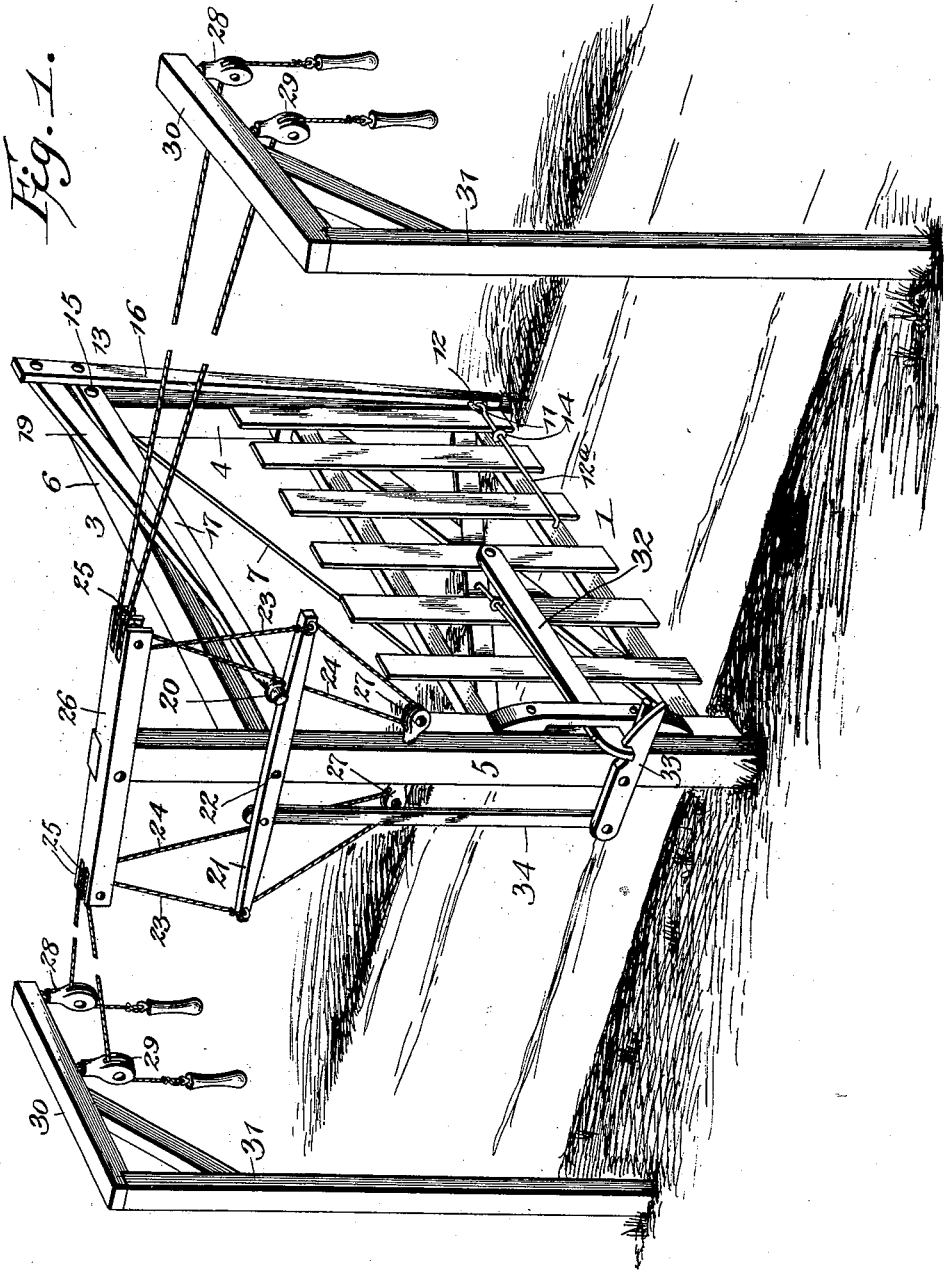

No. 643,811. Patented Feb. 20, 1900.
W. A. COATS.
GATE.
(Application filed Apr. 11, 1899.)
(No Model.) 2 Sheets—Sheet 1.

Witnesses W. A. Coats, Inventor.
By his Attorneys,
C. A. Snow & Co.

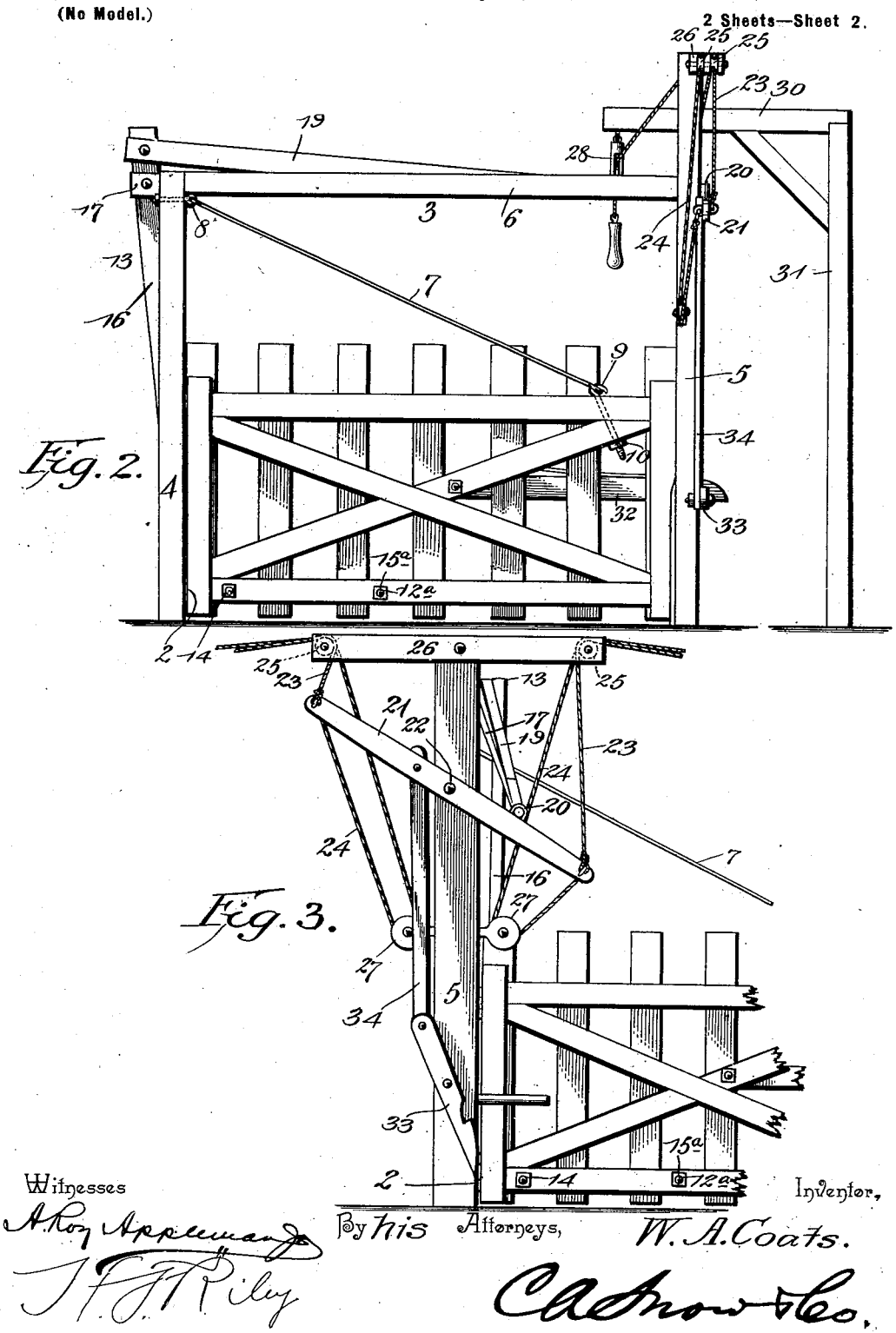

UNITED STATES PATENT OFFICE.

WILLIAM A. COATS, OF MORRILLTON, ARKANSAS.

GATE.

SPECIFICATION forming part of Letters Patent No. 643,811, dated February 20, 1900.

Application filed April 11, 1899. Serial No. 712,634. (No model.)

*To all whom it may concern:*

Be it known that I, WILLIAM A. COATS, a citizen of the United States, residing at Morrillton, in the county of Conway and State of Arkansas, have invented a new and useful Gate, of which the following is a specification.

The invention relates to improvements in gates.

The object of the present invention is to improve the construction of swinging gates, more especially the operating mechanism for opening and closing the same, and to provide a simple and comparatively-inexpensive construction adapted to be readily operated at a distance from either side of a gate and capable of enabling the latter to be readily opened and closed without the necessity of dismounting from a horse or leaving a vehicle.

The invention consists in the construction and novel combination and arrangement of parts, hereinafter fully described, illustrated in the accompanying drawings, and pointed out in the claims hereto appended.

In the drawings, Figure 1 is a perspective view of a gate constructed in accordance with this invention and shown closed. Fig. 2 is an elevation showing the opposite side of the gate. Fig. 3 is an end elevation of the supporting-frame, illustrating the arrangement of the parts when the gate is open.

Like numerals of reference designate corresponding parts in all the figures of the drawings.

1 designates a swinging gate connected by upper and lower hinges with a supporting-frame 3, composed of uprights or posts 4 and 5 and a connecting top piece 6, extending longitudinally of the gate when the latter is closed. The post or upright 4 constitutes a hinge-post, and in order to prevent the gate from sagging and to assist in supporting the same an inclined bracing or stay rod 7 is provided. The stay-rod extends from a hook or eyebolt 8 near the upper end of the post or upright 4 to an adjustable hook 9, which passes through the top horizontal bar of the gate and the adjacent inclined brace. The ends of the rod 7 are preferably provided with eyes, and the hook 9 has its lower portion threaded for the reception of a nut 10, which engages the lower edge of the inclined brace of the gate. The eyebolt or hook 8 and the upper end of the rod 7 form a hinge-joint which is located directly above the hinges of the gate, so that the rod does not interfere with the swinging of the latter, and by adjusting the nut 10 the gate may be raised or lowered to counteract sagging and to adjust it properly.

The gate is provided at one side in advance of the hinges with an eye 11, which is linked into an eye 12 of a bell-crank lever 13, fulcrumed at its angle near the upper end of the post or upright 4 by a bolt 15 or other suitable pivot and consisting of two arms or members extending along the top and rear side of the supporting-frame. The eye 11 of the gate is preferably formed on the end of a rod $12^a$, connected with the gate adjacent to the eye 11 by an eyebolt 14 and having its inner end bent at right angles, extended through the bottom of the gate, and threaded to receive a nut $15^a$.

The bell-crank lever, which may consist of bars 16 and 17, arranged as shown, can of course be constructed in any other suitable manner. The pivot 15 passes through the bar 17, which extends beyond the said pivot and has the bar 16 secured to it. The bar 16 projects above the bar 17, and the bell-crank lever is braced by a bar 19, arranged upon and extending longitudinally of the bar 17 and secured to the upper end of the bar 16. This bar 19 is arranged at an inclination, and it is beveled at its front portion, as shown. When the bell-crank lever is oscillated, the gate will be swung on its hinges, as will be readily understood.

The outer end of the upper arm of the bell-crank lever is rounded and passes through an eye 20 of a horizontal lever 21, located at the upper portion of the supporting-frame and fulcrumed between its ends on a bolt 22, which passes through the upright 5. The lever 21 extends from opposite sides of the upright 5 and has operating-ropes 23 and 24 connected with its ends, whereby the bell-crank lever is oscillated to open and close the gate.

The operating-ropes or other suitable flexible connections, which have their inner terminals attached to the ends of the upper lever 21, are arranged in pairs, as shown, and pass over pulleys 25, arranged at the ends of horizontal arms formed by a bar 26. The bar 26 is centrally mounted on an extension of the upright 5, and its ends are bifurcated or slotted to receive the pulleys 25. One of the operating-ropes of each pair extends upward from the lever 21, and the other operating-ropes extend downward and passes around a lower pulley 27 before it passes over the pulley 25. By this arrangement each pair of operating-ropes is adapted to swing the gate in either direction. The pulleys 27, which are located at opposite sides of the upright 5, are mounted in suitable brackets or blocks.

The outer portions of the operating-ropes are supported by and depend from pulleys 28 and 29, depending from horizontal arms 30 of uprights 31, which are located at suitable distances from the gate to enable the latter to open and close without striking a horse or vehicle.

The gate is provided with a pivoted spring-actuated latch-bar 32, which engages a keeper or catch 33, pivoted between its ends on the latch-post or upright 5 and connected by a link bar or rod 34 with one of the arms of the lever 21, whereby when the gate is operated the keeper or catch will be oscillated. One end of the keeper or catch is beveled to enable the latch to engage its notch or shoulder readily, and its other end is pivoted to the connecting-link 34. The pivoted latch-bar may be readily lifted by hand to enable the gate to be opened without using the operating mechanism.

The invention has the following advantages: The gate, which is simple and comparatively inexpensive in construction, is adjustably supported and prevented from sagging, and the pivoted latch or keeper, which is connected with the lever 21, is operated simultaneously with the gate and readily releases the same. The operating mechanism is simple in construction and positive in operation and will enable the gate to be readily opened and closed at a distance from either side of it, and the construction of the latch is such that the gate may be readily opened and closed by hand without manipulating the operating mechanism.

Changes in the form, proportion, size, and the minor details of construction within the scope of the appended claims may be resorted to without departing from the spirit or sacrificing any of the advantages of this invention.

What is claimed is—

1. The combination of a supporting-frame, a swinging gate, a horizontal lever 21 fulcrumed between its ends on the supporting-frame, a horizontally-disposed catch or keeper located beneath the lever 21 and pivoted between its ends and adapted to hold the gate closed, a link connecting the catch or keeper with the lever 21, means for connecting the gate with the latter, operating cords or ropes arranged in pairs at the ends of the lever 21 and extending upward and downward therefrom, and upper and lower guides receiving the operating-ropes, substantially as described.

2. The combination of a supporting-frame, a gate, a lever 13 connected with the gate, a horizontal lever 21 fulcrumed on the supporting-frame and connected with the said lever, operating cords or ropes arranged in pairs and connected with the horizontal lever and extending upward and downward therefrom, and guides receiving the operating cords or ropes, substantially as described.

3. The combination of a supporting-frame, a swinging gate, a bell-crank lever connected with the gate, a horizontal lever fulcrumed on the supporting-frame and connected with the bell-crank lever, pulleys or guides arranged above and below the horizontal lever, operating cords or ropes arranged in pairs and passing over the said pulleys, said operating-ropes being connected with the horizontal lever and extending upward and downward therefrom, a pivoted catch or keeper mounted on the supporting-frame and holding the gate closed, and a link connecting the catch or keeper and the horizontal lever, substantially as described.

In testimony that I claim the foregoing as my own I have hereto affixed my signature in the presence of two witnesses.

WILLIAM A. COATS.

Witnesses:
A. J. STEPHENS,
J. H. McCLUNY.